United States Patent

Sansoucy

[11] Patent Number: 5,460,206
[45] Date of Patent: Oct. 24, 1995

[54] MODULAR DUCT LINER PANEL

[75] Inventor: Donald M. Sansoucy, Uxbridge, Mass.

[73] Assignee: DB Riley, Inc., Worcester, Mass.

[21] Appl. No.: 199,052

[22] Filed: Feb. 22, 1994

[51] Int. Cl.⁶ .................................................. F16L 57/14
[52] U.S. Cl. ........................ 138/149; 138/158; 138/161
[58] Field of Search .................................... 138/149, 156, 138/158, 161, 147

[56] References Cited

U.S. PATENT DOCUMENTS

| 2,331,644 | 10/1943 | Altorfer et al. | 138/149 |
| 2,331,645 | 10/1943 | Altorfer et al. | 138/149 |
| 2,451,145 | 10/1948 | Baker et al. | 138/149 |
| 2,451,146 | 10/1948 | Baker et al. | 138/149 |
| 2,599,210 | 6/1952 | Thompson | 138/149 |
| 2,707,473 | 5/1955 | Bonvillian et al. | 138/149 |
| 3,687,170 | 8/1972 | Malone et al. | 138/149 |
| 4,183,379 | 1/1980 | Marquette et al. | 138/149 X |
| 4,660,861 | 4/1987 | Argy et al. | 138/149 X |
| 4,732,177 | 3/1988 | Maus et al. | 138/149 X |

Primary Examiner—David Scherbel
Assistant Examiner—Patrick F. Brinson
Attorney, Agent, or Firm—Mason, Kolemainen, Rathburn & Wyss

[57] ABSTRACT

A modular wall liner panel for use in a duct system for containing a flow of gases comprises a central wall segment having a polygonal shape forming an inside wall surface of the, duct and having angularly intersecting pairs of parallel edges. Integral mounting edge flanges are provided adjacent the respective edge of the central wall segment adapted to be detachably securable in place on a supporting grid structure of the duct system wall structure. The grid structure has a plurality of elongated first and second parallel support elements extending transversely to one another and fasteners are provided for detachably securing at least one pair of mounting edge flanges of each duct liner panel to a pair of adjacent parallel support elements of the grid structure.

21 Claims, 3 Drawing Sheets

MODULAR DUCT LINER PANEL

BACKGROUND OF THE INVENTION

1. Field of the Invention

The present invention relates to a new and improved modular duct liner panel for use in a duct system for containing a flow of high temperature gases. The modular duct liner panels are adapted to be easily removed for replacement and repair as necessary and provide means for holding blocks of insulation for reducing heat losses from the high temperature gas flow within the duct system. The duct liner panels are modular in size for selective installation and replacement on the inside surfaces of a duct system wall and are sized so that one man can easily handle a panel for replacement as necessary should deterioration or damage necessitate the same. Moreover, the modular panels are easily manufactured, provide better durability, improved component expansion and contraction characteristics, more attractive acoustical transmission characteristics, improved stability against vibration and also provide an improved walking surface for maintenance personnel while utilizing water for washing of the surface of the panels.

2. Background of the Prior Art

In the past, exhaust duct systems utilized in connection with high temperature gas turbines have been provided with fish scale type panels, which panels have been relatively difficult to remove and replace. The use of flat sheets overlying one another in a fish scale mosaic pattern has been plagued with difficulties because of the need for selective replacement and repair of individual panels in a system employing a plurality thereof. Moreover, in selective catalytic reduction (SCR) systems, dust is generated which tends to accumulate on the surface of the duct wall panels. This dust is water soluble and water is often used to wash off the panels to prevent excessive corrosion thereof.

OBJECTS OF THE INVENTION

It is an object of the present invention to provide a new and improved modular duct wall liner panel for use in duct systems containing a flow of high velocity, high temperature gases.

More particularly it is an object of the present invention to provide a modular duct wall liner panel which is readily serviceable for maintenance, replacement and repair and which can be walked on.

Another object of the present invention is to provide a new and improved modular sized, duct liner panel of the character described which is durable, easily maintained, relatively light in weight and easy to handle by a single maintenance or repair man alone without requiring additional manpower.

Yet another object of the present invention is to provide a new and improved modular duct liner panel which is capable of withstanding high temperature gas flows in the range of 900° F. to 1600° F. at velocities ranging from 3000 ft./min. to 12000 ft./min. while maintaining mechanical integrity and improved operating characteristics with respect to heat loss, vibration, noise dampening and overall strength.

Another object of the present invention is to provide a new and improved modular duct liner panel of the character described which is particularly well suited for gas turbine exhaust systems and for selective catalytic reduction (SCR) systems.

Yet another object of the present invention is to provide a new and improved modular duct system wherein blocks or panels of insulation material are supported, protected and contained in a manner providing improved sound attenuation and reduced vibration.

Still another object of the present invention is to provide a new and improved modular duct liner panel which is capable of accommodating relatively rapid changes in temperature resulting in high gradients of contraction and expansion yet still providing a gastight wall structure with minimal gas leakage and minimal collection and retention of water used for cleaning the surfaces of the panel.

It is another object of the present invention to provide a new and improved modular duct liner wall panel which does not require the use of stand off insulators on cold wall portions.

BRIEF SUMMARY OF THE PRESENT INVENTION.

In accordance with the features of the present invention, a new and improved modular sized, removable/replaceable duct liner panel is provided for use in a duct system containing a flow of hot gases at high velocity. The modular liner panel includes a central wall section of polygonal shape having angularly intersecting pairs of edges and mounting edge flanges formed adjacent thereto adapted to be detachably securable in place on a supporting grid structure. The duct supporting grid structure includes parallel support elements running in transverse directions and mounting edge flanges are formed on the modular liner panels adapted to be secured in place to respective parallel support elements. Fasteners are provided for interconnecting the support elements of the grid structure and the individual liner panels for securing at least one pair of parallel, mounting edge flanges of each liner panel to the grid in a manner permitting rapid expansion and contraction when temperature changes occur during operation start up and shut down. Should a particular liner panel become damaged, broken or eroded, it is individually replaceable on the duct wall grid structure and one man alone can accomplish the removal and replacement of the panel liner.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE PRESENT INVENTION

Figure 1:
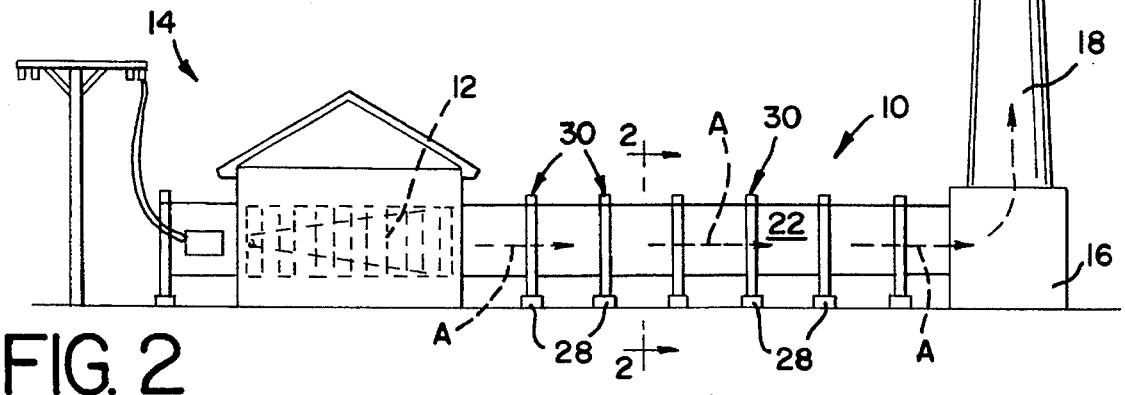
FIG. 1 is a general representation in elevational view of a typical duct system associated with a gas turbine powered electrical power generation station employing a gas turbine generating high velocity exhaust gases at high temperatures passing along the duct system.

Referring now more particularly to the drawings, therein is illustrated a new and improved duct system 10 for containing a high velocity flow of hot gases such as those generated from a gas turbine 12 (FIG. 1) of an electrical power generating station 14. Typically, exhaust gases from a gas turbine may range in temperature from 900° F. to 1600° F. and have an average velocity in the duct system 10 of 3000 ft./min. to 12000 ft./min. depending upon the percentage of full capacity that is handled by the generating station 14.

Typically, exhaust gases leaving the exit of the gas turbine 12 are at the highest temperature and velocity and the temperature and velocity is attenuated somewhat as the gases flow down the duct system 10 toward a gas treatment facility 16 prior to exhausting to the atmosphere through a vertical exhaust stack 18. High temperature, high velocity gas flow duct systems 10 may also be used in a variety of other applications. In SCR applications a water soluble dust is created that deposits out or collects on the inside surfaces of the duct system. This dust-like material is generally water soluble and can be washed away from the duct surfaces with water from time to time as required.

In accordance with the present invention, walls of the duct system 10 are lined with a plurality of modular sized duct liner panels 20 constructed in accordance with the features of the present invention and adapted to be mounted on a supporting grid structure forming opposite vertical side walls 22 and horizontal top and bottom walls 24 and 26 of the duct system. Typically at horizontally spaced intervals along the length of the duct system 10, there is provided a plurality of concrete foundations 28 for supporting rectangular frames 30, each of which includes a pair of vertically extending posts 32 forming vertical support elements for the side walls 22. The vertical posts 32 are joined at the upper ends by horizontal top members 34 and are interconnected at lower end portions by horizontal bottom beams 36.

The vertical posts 32 and horizontal top and bottom beams 34 and 36 respectively are formed of suitably sized structural shapes such as wide flange beams or I beams designed for the load capacity required in order to support the components of the duct system 10 and carry the respective walls. The interior of the duct system 10 is protected against the external environment and weather by means of a continuous outer top wall panel 38, a pair of continuous, opposite, outer side wall panels 40 and a continuous bottom wall panel or pan 42 formed of sheet metal or steel plate of a thickness as required to span the distances and support the design loading between the supporting frame structures 30.

The walls 38, 40 and 42 form a gas-tight enclosure for the duct system 10 for containing the flow of hot gases moving from the gas turbine 12 or selective catalyst reduction system (SCR) to the gas treatment chamber 16. As the gases flow as indicated by the arrows A of FIG. 1, the temperature of the gases may diminish somewhat due to heat loss through the walls of the duct system. In general, less heat insulation is needed in the duct system 10 near the gas treatment facility 16 than is needed near the hotter gas turbine 12.

Inside the wall panels 38, 40 and 42 of the duct system 10 there is provided a plurality of longitudinally extended, spaced apart walers 44 of angular transverse cross-section having outer flanges bolted to or otherwise supported from the respective posts 32, top beams 34 and bottom beams 36 of the frames 30. Along inner edges of inwardly directed flanges of the walers 44 are provided pairs of angles 46 on opposite sides having wall facing flanges 48 in parallel relation with the respective outer wall panels 38, 40 and 42 spaced outwardly thereof. The facing flanges 48 of the angles 46 form parallel mounting surfaces extending longitudinally of the duct system 10. At appropriate intervals along the length of the duct system 10 there are provided a plurality of transverse cross members 50 preferably of T-shaped transverse cross-section having a flange surface 52 parallel of the Wall panels 38, 40 and 42, respectively, and extending transversely between pairs of parallel facing flanges 48 of the angles 46. The facing flanges 48 and 52 thus form a rectangular grid structure having planar mounting faces for engaging edge portions of the removable modular duct liner panels 20.

Figure 7:
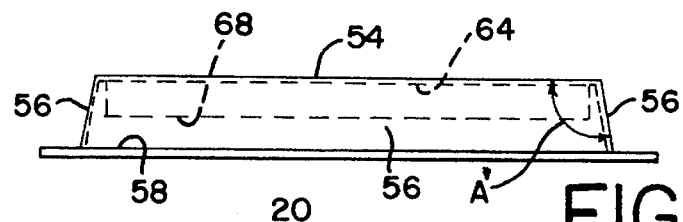
FIG. 7 is an edge elevational view of the panel of the present invention looking in the direction of arrows 7—7 of FIG. 5.
Figure 6:
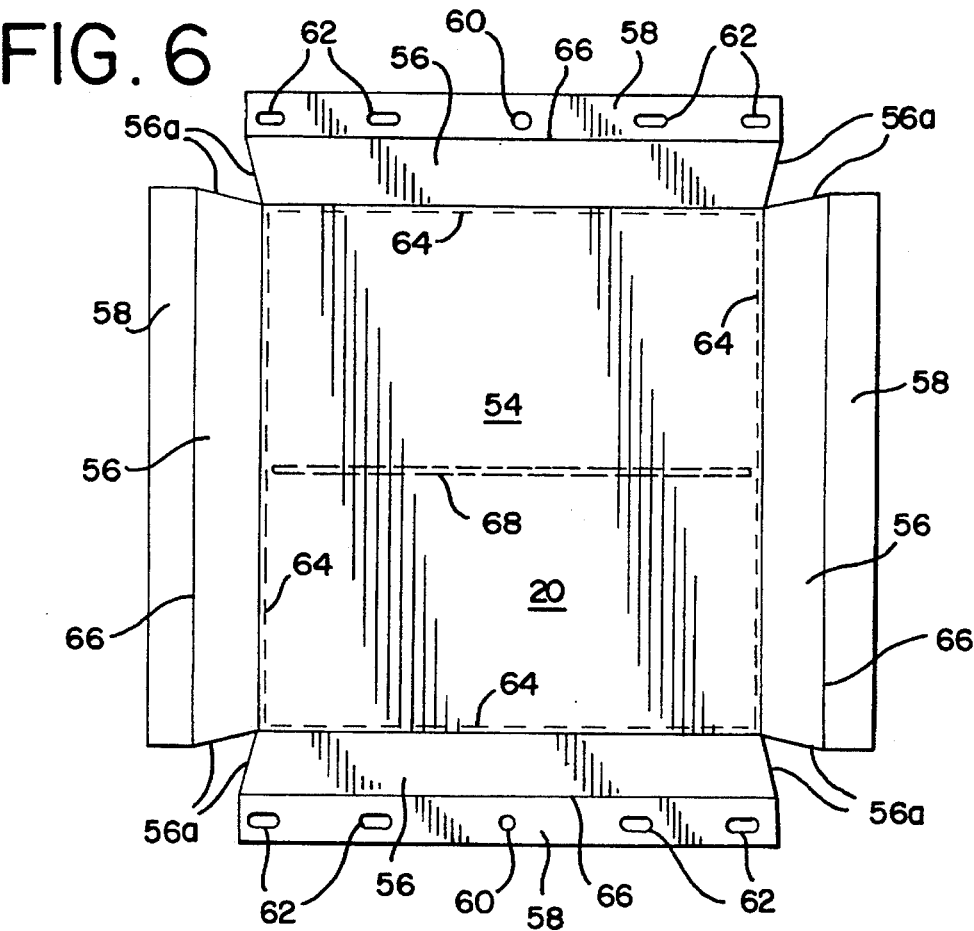
FIG. 6 is a plan view of a metal panel pattern that is used for constructing the modular panel of the present invention.
Figure 5:
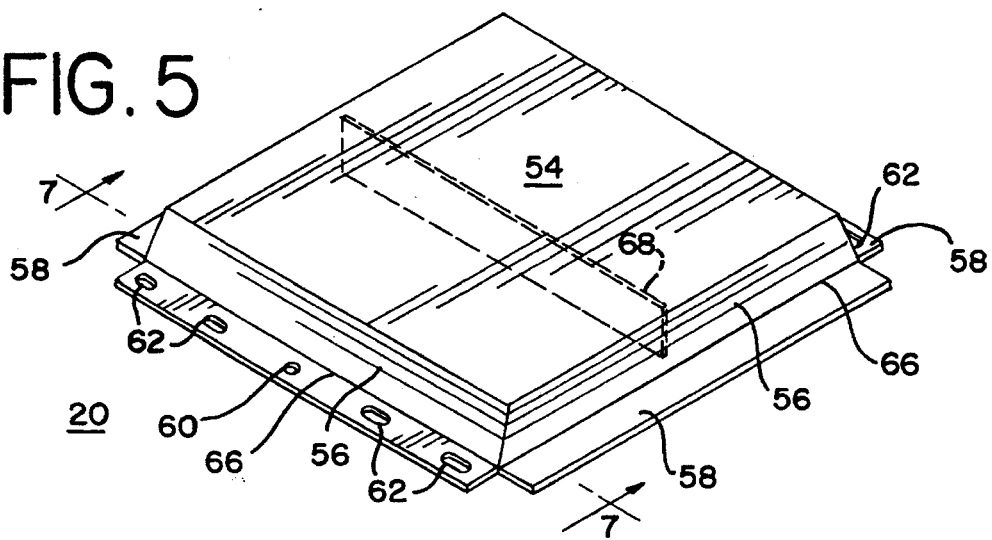
FIG. 5 is a perspective view of a single, modular duct liner panel constructed in accordance with the features of the present invention.

Referring now more particularly to FIGS. 5, 6 and 7, each modular duct liner panel 20 is initially formed from flat sheet stock of appropriate thickness and type of material and a flat pattern of the panels 20 is shown in FIG. 6. Each panel 20 includes a central segment 54 of square or rectangular shape bounded along four side edges by narrow elongated, offsetting intermediate segments 56. Outer longitudinal edges of the intermediate segments 56 in turn are integrally joined with elongated narrow mounting edge flanges 58. At least one pair of opposite mounting edge flanges 58 are formed with a circular opening 60 at the center thereof flanked on opposite sides by elongated, slotted openings 62 at spaced intervals along the length of the mounting edge flange. After the panel patterns are cut from a flat sheet of metal or plate of the desired thickness and material, the intermediate segments 56 are angularly bent along elongated bend lines 64 (FIG. 6) to provide an angular offset between each intermediate segment 56 and the adjacent edge of the center section 54 of the panel (FIG. 7). Preferably, the bend angle between the inner face of the center panel segment 54 and each intermediate segment 56 as indicated by the angle A in FIG. 7 is more than 90 degrees. When the bend is completed, end surfaces 56a at each corner of the control panel pattern segment 54 are in contact with one another and may be welded together if desired.

The elongated mounting edge flanges 58 are bent in opposite directions along lines 66 between adjacent intermediate segments 56 until the mounting edge flanges 58 lie in parallel offset relation, spaced outwardly of the central segment 54 of the panel 20. A stiffening element 68 may also be welded in place to the inside surface of the central panel segment 54 as illustrated to strengthen the panel center and minimize vibration as the hot gases flow past the inside surface of the panels 20 at high velocity.

When the panels are mounted in place on the grid structure formed by the facing flanges 48 of the angles 46 and the facing flanges 52 of the transverse T-shaped cross members 50, the inside surfaces of the mounting edge flanges 58 abut tightly against the grid structure to minimize gas leakage or fluid leakage between the panels. Thus, the interior space bounded between the modular liner panels 20 and the respective outer wall panels 38, 40 and 42 is protected.

Figure 4:
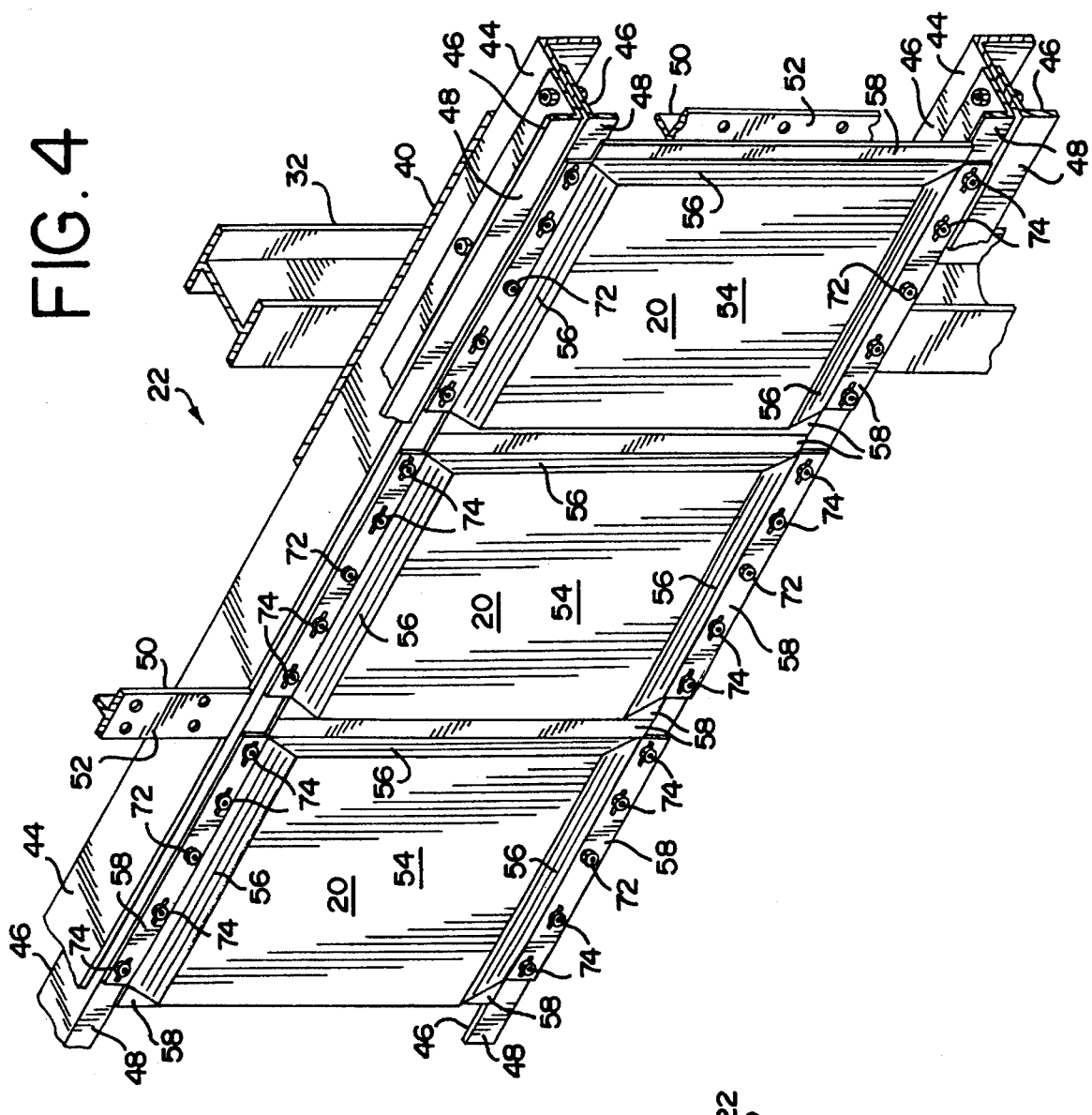
FIG. 4 is a fragmentary perspective view of a segment of a wall section of the duct system of FIG. 1 in accordance with the present invention.

Preferably, bolts or other type fasteners 70 are secured to the facing flanges 48 of the angle to extend outwardly thereof for receiving the panels 20 that are mounted thereon. Shanks of the bolts 70 extend through the central openings 60 in the upper and lower mounting edge flanges 58 of a panel 20 as shown in FIG. 4 and nuts 72 are secured thereon to hold the panels in place at the center. Similarly, bolts 70 spaced apart and flanking the center bolts extend through elongated slots 62 in the upper and lower mounting flanges 58 of the panel and the slotted openings permit expansion and contraction of the panels 20 in a longitudinal direction in opposite directions away from the center portion which is secured tightly. Appropriately, nuts 74 are affixed to these outwardly spaced bolts 70 but are not tightened enough to prevent expansion and contractive movements of the mounting edge flanges 58 of the modular panels 20 during heating and cooling cycles of operation.

Figure 2:
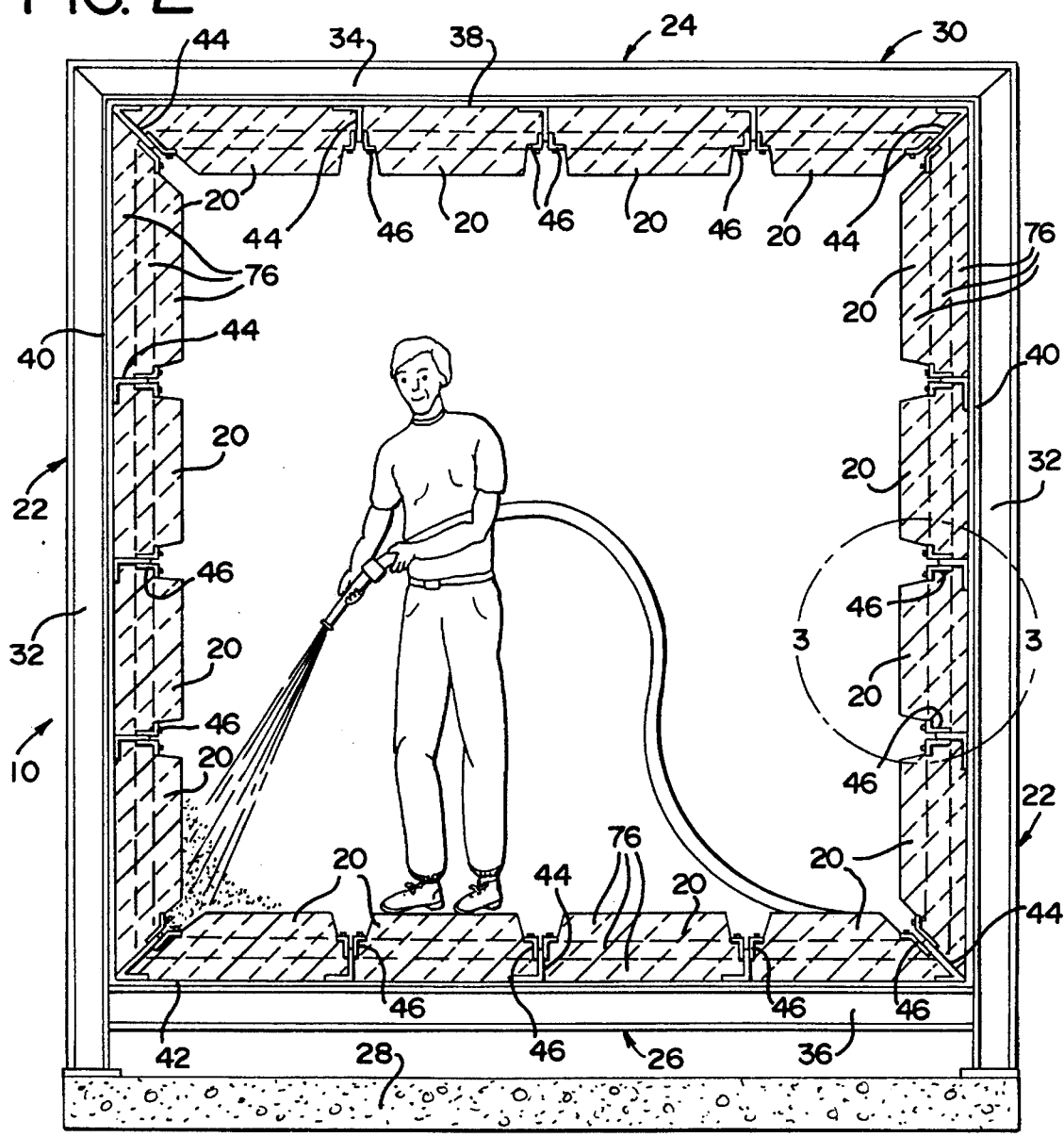
FIG. 2 is an enlarged transverse cross-sectional view of the duct system employing a plurality of modular, duct liner panels constructed in accordance with the present invention taken substantially along lines 2—2 of FIG. 1.
Figure 3:
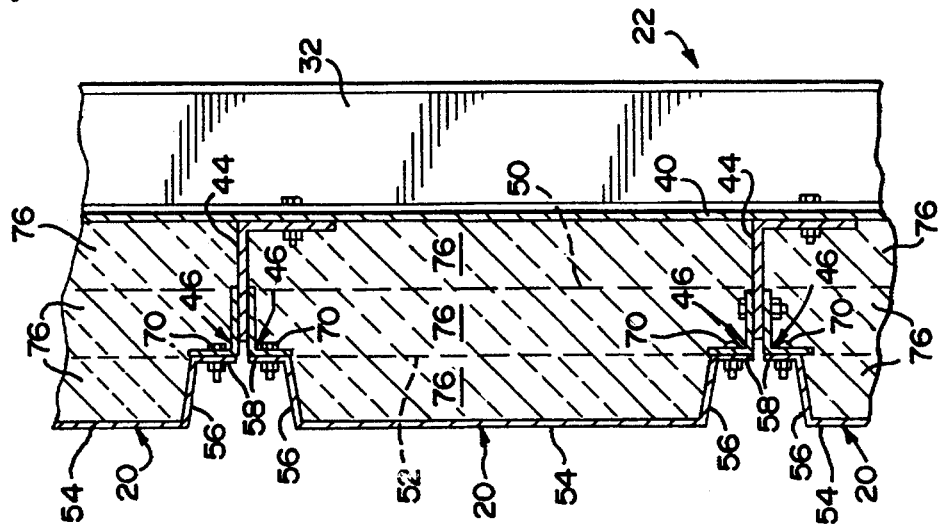
FIG. 3 is an enlarged fragmentary sectional view of a portion of a side wall section of the duct system of FIG. 1 in accordance with the present invention.

As best illustrated in FIGS. 2 and 3, behind each modular duct liner panel 20 in place on the grid structure of a wall 22, roof 24 or floor 26, there is provided one or more blocks of heat insulation material 76 of appropriate size and shape to fit within the enclosed space between the inner wall surface of the installed modular duct liner panels 20 and the continuous outer wall panels 38, 40 or 42. The insulation blocks or batts 76 are normally made of mineral wool or other suitable material which is capable of withstanding relatively high temperatures without deterioration yet still affording a relatively high heat and sound insulation capability.

The modular, duct liner panels 20 are easily handled by one man and may be fastened in place or removed from the grid structure in an efficient and rapid manner when necessary, merely by unthreading the nuts 72 and 74 along opposite mounting edge flanges 58 followed by withdrawing the panel inwardly. In addition, the inside surfaces of the modular duct liner panels 20 may be cleaned and deposits removed therefrom by spraying with water from a hose as indicated in FIG. 2. Only minimal amounts or no water will pass into the batts insulation material 76 between the panels 50 and the respective wall panels 38, 40 and 42 during a normal washing operation because of the tight overlying fit between the mounting edge flanges 58 and the facing grid structure flanges 48 and 52. The central stiffener 68 in each panel 20 precludes excessive vibration during operation. The type of material as well as the thickness of the panel material is chosen to best withstand the harsh environment of the interior of the duct system 10. Stainless steels and other rust and corrosion resistant metals are used. Where less insulation is required, one or more of the heat insulating mineral wool batts 76 may be eliminated to reduce cost. If the insulation batts 76 become water-logged or otherwise ineffective, they can be easily removed and replaced when a panel 20 is removed from the supporting grid structure.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A duct for containing a flow of gases, comprising:

a wall having a plurality of duct liner wall panels including at least one modular, individually removable, duct liner panel detachably securable in place on a supporting grid structure having first parallel support elements extending in a first direction and second support elements extending in a second direction transverse to said first direction;

said panel including a central wall section forming a generally planar, inside wall surface of said duct and surrounded along peripheral edges thereof by integrally formed mounting edge flanges parallel of respective ones of said support elements; and fastener means accessible from inside said duct for detachably securing at least one pair of said parallel support elements to respective adjacent edge flanges of said panel.

2. The duct of claim 1, wherein said duct includes:

an outer wall spaced apart outwardly of said central wall surface of said panel and at least one layer of insulation material interposed between said panel and said outer wall.

3. The duct of claim 1, wherein:

said panel includes a plurality of intermediate segments spaced between an edge of said central wall section and an adjacent mounting edge flange for positioning said inside wall surface of said panel inwardly of supporting grid structure.

4. The duct of claim 3, wherein:

said intermediate segments are angularly offset from a plane parallel of said central wall section.

5. The duct of claim 4, wherein:

said intermediate segments and said mounting edge flanges are integral with said central wall section of said panel.

6. The duct of claim 3, wherein:

said intermediate Segments are integrally joined with said edges of said central wall section along first bend lines and said mounting edge flanges are integrally joined with said intermediate segments along second bend lines parallel of respective first bend lines.

7. The duct of claim 3, wherein:

said central wall section is spaced inwardly of and parallel to fastening surfaces of said grid structure forming an insulation space therebetween for containing a layer of heat insulating material.

8. The duct of claim 1, wherein:

said fastener means comprises a plurality of fasteners mounted on said first parallel support elements of said grid structure at spaced intervals thereon and adapted to engage adjacent mounting edge flanges of said panel for securing said panel in place on said grid structure.

9. The duct of claim 8, wherein:

at least a first one of said fasteners on each of said first parallel support elements is in a fixed position relative to said grid structure and are adjacent, engaged mounting edge flange of said panel and at least a second one of said fasteners is provided on each of said first parallel support elements permitting movement relative to said fixed position between said engaged mounting edge flange and said grid structure.

10. The duct of claim 9, wherein:

said second fasteners are fixedly secured on said grid structure and said engaged mounting edge flanges are slotted to receive said fixedly mounted fasteners and permit said relative movement.

11. The duct of claim 10, wherein:

a pair of said second fasteners are provided on opposite sides of a first fastener on each of said first parallel support elements.

12. A modular, individually removable panel for use as a duct liner panel in a duct containing a plurality of said duct liner panels for containing a flow of gases:

said panel including a central wall portion forming a polygonal-shaped, substantially flat, inside wall surface of said duct having angularly intersecting pairs of parallel edges and mounting edge flanges adjacent thereto integrally formed along each of said edges, respectively, said mounting edge flanges adapted to be detachably securable in place on a supporting grid structure having first parallel support elements extending in a first direction and second support elements extending in a second direction transverse to said first direction; and fastener means accessible from inside said duct for detachably securing at least one pair of said parallel support elements to a pair of respective, adjacent mounting edge flanges of said panel.

13. The modular panel of claim 12, wherein:

said panel includes a plurality of intermediate segments each spaced between an edge of said central wall section and an adjacent mounting edge flange for positioning said inside wall surface of said panel inwardly of supporting grid structure.

14. The modular panel of claim 13, wherein:

said intermediate segments are angularly offset from a plane parallel of said central wall section.

15. The modular panel of claim 14, wherein:

said intermediate segments and said mounting edge flanges are integral with said central wall section of said panel.

16. The modular panel of claim 13, wherein:

said intermediate segments are integrally joined with said edges of said central wall Section along first bend lines and said mounting edge flanges are integrally joined with said intermediate segments along second bend lines parallel of respective first bend lines.

17. The modular panel of claim 13, wherein:

said central wall section is spaced inwardly of and parallel to fastening surfaces of said grid structure forming an insulation space therebetween for containing a layer of heat insulating material.

18. The modular panel of claim 12, wherein:

said fastener means comprises a plurality of fasteners mounted on said first parallel support elements of said grid structure at spaced intervals thereon and adapted to engage adjacent mounting edge flanges of said panel for securing said panel in place on said grid structure.

19. The modular panel of claim 18, wherein:

at least a first one of said fasteners on each of said first parallel support elements is in a fixed position relative to said grid structure and are adjacent, engaged mounting edge flange of said panel and at least a second one of said fasteners is provided on each of said first parallel support elements permitting movement relative to said fixed position between said engaged mounting edge flange and said grid structure.

20. The modular panel of claim 19, wherein:

said second fasteners are fixedly secured on said grid structure and said engaged mounting edge flanges are slotted to receive said fixedly mounted fasteners and permit said relative movement.

21. The modular panel of claim 20, wherein:

a pair of said second fasteners are provided on opposite sides of a first fastener on each of said first parallel support elements.

* * * * *